United States Patent [19]

Hünten

[11] 3,719,310
[45] March 6, 1973

[54] CLOSURE NOZZLE FOR INJECTION MOLDING MACHINES

[75] Inventor: Werner Hünten, Stein, near Nuremberg, Germany

[73] Assignee: Ankerwerk Nurnberg GmbH, Nuremberg, Germany

[22] Filed: Feb. 24, 1971

[21] Appl. No.: 118,423

[30] Foreign Application Priority Data

Feb. 26, 1970 Germany.................P 20 09 006.6

[52] U.S. Cl. ..................222/497, 425/146, 425/245
[51] Int. Cl. ..............................................B29f 1/03
[58] Field of Search..........................18/30 NW, 18/30 NS, 30 NY, 30 NV, 18/30 NZ, 30 NM, 30 RV; 425/192, 146, 245; 222/509, 497

[56] References Cited

UNITED STATES PATENTS

| 2,422,990 | 6/1947 | Spanier | 425/178 |
| 3,535,742 | 10/1970 | Marcus | 425/245 X |
| 3,295,169 | 1/1967 | Moslo | 425/245 X |
| 3,482,285 | 12/1969 | Falkenberg | 425/245 X |

Primary Examiner—J. Spencer Overholser
Assistant Examiner—David S. Safran
Attorney—George F. Dvorak, Stephen T. Skrydlak and Marden S. Gordon

[57] ABSTRACT

A closure nozzle for use on an injection moulding machine comprising a nozzle carrier adapted for connection to the plasticizing cylinder of the machine, a nozzle arranged displaceably relative to the nozzle carrier, a spring loaded closure element axially displaceable in a co-axial bore in the nozzle carrier and displaceable relative to the nozzle, and a locking element operatively associated with the closure element for the controlled opening and closing of the closure element.

11 Claims, 3 Drawing Figures

PATENTED MAR 6 1973  3,719,310

CLOSURE NOZZLE FOR INJECTION MOLDING MACHINES

The purpose of closure nozzles on injection-moulding machines is to provide a pressure-tight closure for the plasticizing cylinder during the time when no molten plastic is issuing therefrom, so that the pressure required to melt and homogenize the plastic compound may be maintained.

Various designs of closure nozzles for injection-moulding machines are known, especially those consisting of a nozzle carrier and nozzle adapted to be connected to the plasticizing cylinder of the injection-moulding machine, and a spring-loaded closure element arranged to move axially in a co-axial bore in the nozzle carrier. Closure nozzles fall into two main groups: displacement nozzles and needle closure nozzles.

In the case of displacement nozzles, the closure element is rigidly connected to the nozzle and is arranged displaceably in a co-axial bore in the nozzle carrier. The inlet aperture into the melt duct in the closure element is closed when the latter is in the forward position — the nozzle is not attached to the tool. If the nozzle is placed against the tool, and the plasticizing cylinder, with the nozzle carrier, is moved further towards the tool, then the nozzle and the closure element will be pushed backwards in relation to the nozzle carrier, thus exposing the nozzle aperture, and the molten plastic may then pass through the melt duct in the closure element and through the nozzle, under the action of the injection pressure, and into the mould-cavity in the tool. No appreciable loss of pressure occurs during this operation. However, displacement nozzles have the disadvantage, highly detrimental in practical use, that is is impossible to eject the molten plastic when the nozzle is exposed, i.e. when it is not lying against the tool. When there is a change of color or a change of material, however, and especially in the case of a breakdown, this free ejection is always desirable or even indispensable.

In needle-closure nozzles, the plasticizing cylinder, the nozzle carrier, and the nozzle are rigidly connected to each other. The closure needle is sealingly mounted and spring-loaded in a co-axial bore in the nozzle carrier. The conical tip thereof closes off the nozzle aperture from the inside. The melt ducts run eccentrically in the nozzle carrier, the molten plastic passing therethrough into the nozzle cap. Under the action of the increased injection pressure, the closure needle moves back against the spring loading and exposes the nozzle aperture. Needle-closure nozzles permit free ejection, but upon injection into the mould-cavity in the tool, this principle produces a considerable loss of pressure, corresponding to the opening pressure. It is also a disadvantage that the injection pressure must always be higher than the opening pressure of the needle-closure nozzle, and that the pressure for plasticizing the molten plastic must always be lower than the said opening pressure. With different types of plastic and different processing conditions, depending upon the article, various pressure ratios are required, to which the needle-closure nozzles must be matched. This means a tremendous stock of needle-closure nozzles, each with a different opening pressure. With these nozzles it is impossible to maintain an after-pressure below the opening pressure, but this is frequently a critical factor in the quality of the moulding.

Although another type of needle-closure nozzle is known, it constitutes in principle a consecutive arrangement of needle-closure and displacement nozzles, and thus combines all the disadvantages described above, while retaining none of the advantages.

It is the aim of the invention to produce a needle-closure nozzle which overcomes the disadvantages mentioned above while largely retaining the advantages; more particularly, the pressure loss in the nozzle during injection into the mould cavity is to be negligeable, and free ejection is to be possible. Moreover the new closure nozzle is to be simple in construction and reliable in operation.

According to the invention, this aim is to be accomplished, in the case of the closure nozzles described at the beginning hereof, in that the nozzle is arranged displaceably in relation to the nozzle carrier, the closure element is also arranged displaceably in the nozzle, and a locking insert is associated with the said closure element. It is a characteristic of the invention that the nozzle consists of a nozzle element and a nozzle cap which can be placed thereon and which has a nozzle aperture arranged co-axially in known fashion. In another design according to the invention, the nozzle element exhibits a central bore for the accommodation of the closure element, the said bore forming a step and being of a lesser cross-section towards the nozzle carrier. In one advantageous configuration, the nozzle element exhibits a flange having screw holes uniformly distributed around a circle on the face of the said flange, spacing screws being used to attach the said flange to a flange on the nozzle carrier. Another characteristic of the invention provides at least one compression spring between the said two flanges. The invention furthermore recommends that the closure element be provided with a tip adapted to be placed against the inside of the nozzle aperture and to close it off; also that the said closure element be provided with a longitudinal melt duct, the inlet end of which is funnel-shaped, while the outlet end opens into the free space in the nozzle cap through oblique holes in the vicinity of the said tip. Another design of the invention is to be perceived in that the closure element is provided with a front part and a shank, the transition from the said front part to the said shank consisting of a shoulder and the cylindrical section of the said front part being shorter than the cylindrical bore in the nozzle element, while the said shank projects sealingly into the central bore in the nozzle carrier. It is also of advantage for the locking insert between the nozzle carrier and the nozzle element surrounding the closure element also to be arranged to be axially displaceable. The invention moreover recommends that the locking insert be in the form of a rotary element having a cylindrical bush and a flange, the said cylindrical bush being arranged displaceably in an expanded nozzle-carrier bore, the flange being guided by the spacer screws. Another configuration makes provision for closing springs arranged between the two flanges, preferably surrounding the said spacer screws. Finally, it is characteristic of the invention that the locking insert has a locking device consisting, on the one hand, of balls arranged movably in radial bores in the cylindrical bush and a peripheral groove in the shank of the closure element and, on the other hand, of a peripheral groove in the nozzle carrier.

The advantages of the invention are to be perceived mainly in that the new nozzle may eject freely and in that when it ejects into the mould cavity there is only a minor pressure loss originating in the flow duct. The invention makes it suprisingly simple to keep the closure nozzle open mechanically during the injection operation and, if it be desired, also to eject freely, i.e. without placing the nozzle against something. In one unexpectedly simple design, the displacement nozzle and the needle-closure nozzle are arranged in parallel which, surprisingly enough, produces the advantage of both and the disadvantages of neither.

The invention is explained hereinafter in greater detail with the aid of an example of execution illustrated in the drawings, wherein.

Figure 1:
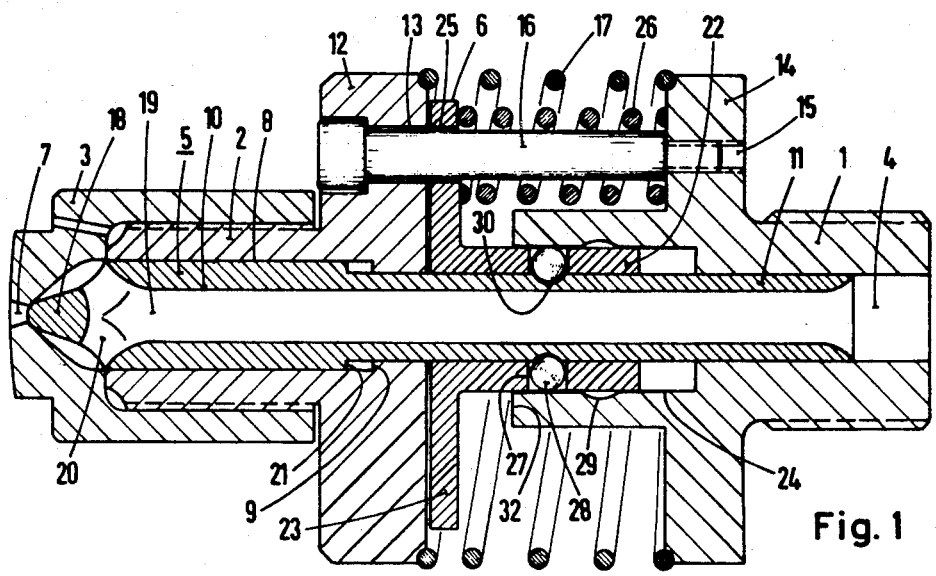
FIG. 1 is a cross section through the object of the invention in the neutral position.
Figure 3:
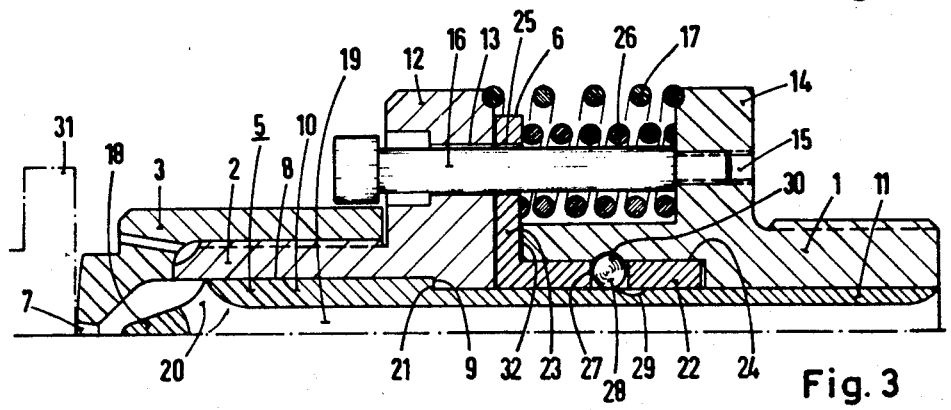

FIG. 3 again shows the upper half of the cross section in FIG. 1, but in a position corresponding to injection into the tool.

Screwed into the plasticizing cylinder, not shown, of a worm injection moulding machine is nozzle carrier 1 connected to nozzle 2, 3. Running co-axially in the said nozzle carrier is a bore 4 in which a closure element 5 moves axially. As explained in greater detail hereinafter, nozzle 2, 3 is displaceable in relation to the said nozzle carrier, and closure element 5 is displaceable in relation to nozzle carrier 1 and nozzle 2, 3. Associated with closure element 5 and nozzle carrier 1 is a locking insert 6. Nozzle 2, 3 consists in known fashion of a nozzle element 2 with a nozzle cap 3, in which nozzle aperture 7 runs co-axially. Nozzle element 2 has a so-called nozzle-element bore 8 arranged co-axially with bore 4 in nozzle carrier 1, but the said bore 8 forms a step and thus is of a decreased diameter towards nozzle carrier 1. Mounted sealingly in the bore 8 is closure element 5 with its front part 10, whereas only the last part of its shank 11 is arranged in bore 4 in nozzle carrier 1. Nozzle element 2 has a flange 12, on the face whereof screw holes 13 are arranged equally spaced around a circle. Nozzle carrier flange 14 has corresponding threaded holes 15. Nozzle element 2 and nozzle carrier 1 are joined together by means of spacer screws 16. In order to ensure that nozzle element 2 and nozzle carrier 1 are as far apart as spacer screws 16 allow them to be in the neutral position, a compression spring 17 is arranged between these parts. During operation, this spacing is also maintained by the pressure of the molten plastic, so that compression spring 17 may possibly be omitted.

In the closure nozzle according to the invention, the nozzle aperture is closed from the inside by spherical tip 18 which lies thereagainst. The molten plastic passes from the plasticizing cylinder through melt duct 19 running longitudinally through closure element 5, At its inlet end, the said duct 19 is funnel shaped in the region of nozzle carrier 1; at its outlet end, in the region of nozzle cap 3, it opens into nozzle cap 3 through oblique holes 20 near tip 18. As already indicated above, closure element 5 consists of a tip 18, a cylindrical front part 10, and a similarly cylindrical shank 11.

The transition from part 10 to shank 11 is in the form of a step 21. Front part 10 is mounted sealingly in nozzle-element bore 8, just as the end section of shank 11 is mounted sealingly in co-axial bore 4, and the molten plastic therefore cannot enter here. Cylindrical front part 10 of closure element 5 is shorter than the corresponding section of nozzle-element bore 8, which determines the travel of closure element 5. The latter may also have guide elements to prevent it from twisting.

Locking insert 6 is also axially displaceable between nozzle carrier 1 and nozzle element 2; it surrounds closure element 5 and the front section of shank 11 thereof. It is in the form of a circular element having a cylindrical bush 22 and a flange 23, the bush projecting into an expanded bore 24 in the nozzle carrier, where it is displaceable. Flange 23 has screw holes 25 corresponding to spacer screws 16 which guide it. In order to bring the locking insert into the forward position shown in FIG. 1, and to hold it there, when it is coupled to closure element 5, closing springs 26 are provided between flanges 14 and 23 and preferably surrounding spacer screws 16, the said closing springs 26 determining the opening pressure of the closure nozzle according to the invention when free ejection is desired. The said opening pressure may be adjusted by the type and number of closing springs 26. Locking insert 6 may be selectively coupled to closure element 5 by means of a locking device, and thus transfers the force of closing springs 26 to closure element 5; or the said locking device may be coupled to nozzle carrier 1, which absorbs the force of the said closing springs, leaving the said closure element semi-freely moveable. The said locking device consists of balls arranged to move in radial bores 27 in cylindrical bush 22, the said balls co-operating, on the one hand, with peripheral groove 29 in shank 11 of closure element 5 or, on the other hand with peripheral groove 30 in nozzle carrier 1.

Figure 2:
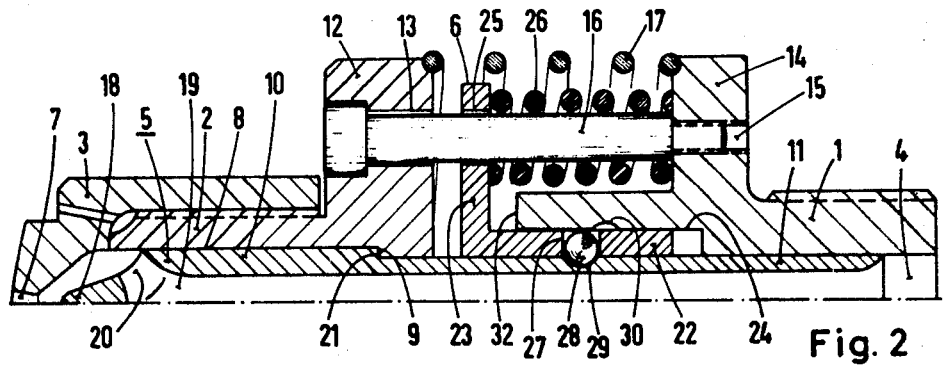
FIG. 2 shows the upper half of the cross section in FIG. 1, but in a position permitting free ejection.

The closure nozzle according to the invention operates as follows: in the neutral position, all parts are in the position shown in FIG. 1, as may be gathered from the foregoing description of the drawings. This position is also maintained while the plastic is being plasticized, at which time the relatively low plasticizing pressure obtains in the said closure nozzle. If it is now desired to clean the closure nozzle by free ejection, because production is being started, or because of a color change, of for any other reason, the worm piston of the injection-moulding machine is moved forward. This increases the pressure in the molten plastic ahead of the said piston, and this increased pressure also reaches nozzle cap 3. As explained hereinbefore in another way, closure element 5 is in the form of a differential piston, with the larger surface towards nozzle cap 3. As shown in FIG. 2, this increased injection pressure causes closure element 5 to move backwards in relation to nozzle 2, 3 until step 21 comes up against step 9 and nozzle aperture 7 is exposed. During this displacement, closure element 5 remains coupled to locking insert 6, so that closing springs 26 oppose the opening pressure. The arrangement of peripheral groove 29 makes release impossible, since nozzle 2, 3 is held in its foremost position by the pressure of the molten plastic, as may clearly be seen in FIG. 2. Since free ejection requires that the force of closing springs 26 be overcome, a pressure loss must be expected, as always in the case of needle-closure nozzles. In the case of free ejection, however, this is no problem. In the case of injection into the mould cavity, closing springs 26 do not come into action, as explained hereinafter. This makes it possible to use a very high opening pressure, and the plasticizing pressure may therefore be adequately high, without causing the closure nozzle to open.

If it is now desired to inject into the mould cavity, the closure nozzle according to the invention acts as a displacement nozzle. When the plasticizing cylinder is moved forward, nozzle cap 3 comes up against tool 31 (FIG. 3) and is moved backwards, together with nozzle element 2 and locking insert 6, still coupled to closure element 5, in relation to nozzle carrier 1, against the force of compression spring 17 and closing springs 26, until nozzle-element flange 12 is pressed firmly against flange 23, and the latter is pressed against front face 32 of nozzle carrier 1. In this position, balls 28 reach peripheral groove 30 in nozzle carrier 1 and closure element 5 is released from locking insert 6 and can escape rearwardly, without any opposing force, from the pressure of the molten plastic in the nozzle cap, thus allowing the closure nozzle to open. Since, as already indicated, closing springs 26 are not now acting on closure element 5, there is no opening pressure to be overcome, and injection into the mould cavity in the tool takes place with no appreciable pressure loss. The only pressure loss is that caused by the friction of the molten plastic in the flow ducts which, in the closure nozzle according to the invention, are of a particularly satisfactory design. If the injection process is ended and after-pressure is no longer required which, in the case of the closure nozzle according to the invention may be held at any level since there is no opening pressure to be overcome, the plasticizing cylinder is moved back. For the moment, the pressure of spring 17 keeps nozzle 2, 3 up against tool 31, so that the said nozzle moves forwards in relation to nozzle carrier 1 and locking insert 6 coupled thereto. Since shoulder 21 and step 9 are still together, closure element 5 is carried along with this movement. When peripheral groove 29 passes radial bores 27, balls 28 enter and release locking insert 5 from nozzle carrier 1. Further retraction of the plasticizing cylinder and nozzle carrier 1 screwed thereinto brings the parts back to the starting position shown in FIG. 1, and the closure nozzle is closed once more and may be moved away from the tool without any molten plastic emerging.

I claim:

1. A closure nozzle for an injection-moulding machine including a plasticizing cylinder for plasticized plastic, said nozzle comprising: a nozzle carrier having one end adapted to be connected to the plasticizing cylinder of the injection-moulding machine; a nozzle movably attached to the other end of the nozzle carrier for longitudinal displacement between an advanced and a retracted position relative to the nozzle carrier, a nozzle outlet provided in the end of the nozzle furthest from the nozzle carrier, a nozzle passage extending longitudinally through said nozzle and in communication with said outlet, a nozzle carrier passage extending longitudinally through said nozzle carrier having one end in communication with said nozzle passage and the other end adapted for communication with said plasticizing cylinder, a closure member disposed in said nozzle passage and axially displaceable relative thereto, said closure member including a differential piston having a passageway extending partially therethrough, one end of the piston passageway opening into said nozzle carrier passageway with the other end of the piston passageway terminating near the piston end adjacent the nozzle outlet and opening into the nozzle passageway, resilient means operatively associated with the piston for exerting thereon a predetermined pressure in the forward direction to urge the piston portion adjacent the outlet into sealing engagement with the outlet to sealingly close said nozzle passage from said outlet, said resilient means permitting rearward movement of said piston relative to the nozzle carrier upon discharge of plastic material from the plasticizing cylinder through the piston passageway into the nozzle passage under sufficient predetermined pressure to overcome the pressure of said resilient means on said piston and urgingly move said piston rearwardly relative to the nozzle and nozzle carrier thereby opening said outlet to said nozzle passage for discharge of the plastic material therethru, a locking assembly associated with said closure member comprising means engaging the closure member and slideable relative thereto between an advanced and retracted position; locking means on said sliding means adapted to lockingly engage said sliding means with said closure member in the advanced position and to disengage therefrom in the retracted position so as to lockingly engage said sliding means with said nozzle carrier in the retracted position; locking assembly resilient means operatively associated with said sliding means normally urging the same toward the advanced position; the advanced position pressing said piston portion of said closure member into engagement with said nozzle outlet, and the retracted position removing the pressure of the locking assembly resilient means from the closure member permitting the opening of the outlet by retracted movement of the closure member under pressure of the discharging plastic material independent from any influence of said locking assembly resilient means.

2. A closure nozzle according to claim 1 wherein said sliding means includes a sleeve surrounding a portion of the closure member, a flange member connected to one end of the sleeve and projecting radially therefrom, said locking assembly resilient means being in the form of a spring interposed between the flange and the carrier nozzle, and the end portion of the sleeve opposite the flange being slidably received within a radially expanded portion of the carrier nozzle passageway.

3. A closure nozzle according to claim 2 wherein said locking means comprises a radially extending opening in the portion of the sleeve slideably received within the nozzle carrier passageway; a ball larger in its major diameter than the length of said hole and received therein for radial movement; a circumferentially extending peripheral groove in the closure member; a circumferentially extending peripheral groove in the expanded portion of the nozzle carrier passageway; said ball lockingly engaging said groove in said closure member in said advanced position and lockingly engaging said groove in said nozzle carrier in said retracted position.

4. A closure nozzle according to claim 3 wherein the nozzle consists of a nozzle element and a nozzle cap mounted thereon, said nozzle outlet disposed in said cap, said nozzle cap being selectively adjustable relative to said nozzle element for selectively varying the volume of area rearwardly of said outlet.

5. A closure nozzle according to claim 1 wherein the nozzle passageway is radially expanded forwardly of the rear end of the nozzle so as to form a shoulder portion therein, and said closure member being similarly radially expanded at its front portion received within the radially expanded passageway and having a complementary shoulder defined thereon adapted for engagement with said shoulder portion on said nozzle.

6. A closure nozzle according to claim 5 wherein the nozzle has a flange carrying screw holes spaced around a circle on the face of the flange, a flange on said nozzle carrier spaced from said flange on said nozzle, and said nozzle flange being attached to said nozzle-carrier flange by spacer screws.

7. A closure nozzle according to claim 6 wherein at least one compression spring is arranged between the nozzle flange and the nozzle-carrier flange.

8. A closure nozzle according to claim 1 wherein the closure member has a tip adapted to be engaged against the inside of the nozzle outlet to close off the nozzle outlet; and in that the closure member is provided with a melt duct passing longitudinally through the closure element, the inlet and of the duct is funnel-shaped with the outlet end of the duct opening into a free space defined behind the nozzle outlet in the nozzle passageway through oblique holes in the closure member arranged near the tip of the closure member.

9. A closure nozzle according to claim 8 wherein the closure member is provided with a front part and a shank, the transition from the front part to the shank being in the form of a step, and the front part being longitudinally shorter than the nozzle passageway while the shank projects slidably sealingly into the nozzle carrier passageway.

10. A closure nozzle according to claim 2 wherein said sleeve connected flange member has screw holes spaced around a circle on the face of the flange, and spacing bolts extending through said holes to guide the movement of said sleeve.

11. A closure nozzle according to claim 10 wherein spacer screws are arranged between the flange on the sleeve and a flange attached to the nozzle carrier, and closing springs surrounding the spacer screws interposed between said flanges.

* * * * *